(12) United States Patent
Fang et al.

(10) Patent No.: US 10,542,440 B2
(45) Date of Patent: Jan. 21, 2020

(54) INTEGRATED WIRELESS LOCAL AREA NETWORK FOR SPECTRUM SHARING

(71) Applicant: ZTE Corporation, Shenzhen, Guangdong (CN)

(72) Inventors: Yonggang Fang, San Diego, CA (US); Bo Sun, Guangdong (CN); Li Zhang, Guangdong (CN)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 16/154,693

(22) Filed: Oct. 8, 2018

(65) Prior Publication Data
US 2019/0045371 A1  Feb. 7, 2019

Related U.S. Application Data

(62) Division of application No. 14/145,690, filed on Dec. 31, 2013, now Pat. No. 10,098,002.

(30) Foreign Application Priority Data

Dec. 31, 2012 (WO) ................ PCT/CN2012/088102

(51) Int. Cl.
*H04W 16/14* (2009.01)
(52) U.S. Cl.
CPC .................................. *H04W 16/14* (2013.01)
(58) Field of Classification Search
None
See application file for complete search history.

(56) References Cited

U.S. PATENT DOCUMENTS

| 4,670,899 | A | 6/1987 | Brody et al. |
| 7,436,801 | B1 | 10/2008 | Kanterakis |
| 8,243,632 | B1 | 8/2012 | Oh et al. |
| 8,711,721 | B2 * | 4/2014 | Smith ................... H04W 16/14 370/252 |
| 2002/0022483 | A1 | 2/2002 | Thompson et al. |
| 2003/0134642 | A1 | 7/2003 | Kostic et al. |
| 2003/0169713 | A1 | 9/2003 | Luo |

(Continued)

FOREIGN PATENT DOCUMENTS

| CN | 101640892 A | 2/2010 |
| CN | 102474349 A | 5/2012 |

(Continued)

OTHER PUBLICATIONS

Chinese Office Action dated Nov. 4, 2016 for Chinese Patent Application No. 201310745776.1, filed on Dec. 30, 2013 (7 pages).

(Continued)

*Primary Examiner* — Brian S Roberts
(74) *Attorney, Agent, or Firm* — Perkins Coie LLP

(57) ABSTRACT

A wireless communication system includes a database that holds spectral usage and availability information, an access point that operates to provide wireless services from a plurality of service operators and a gateway that receives a wireless spectrum allocation request from a service operator, determines spectrum availability by consulting the database, responds to the service operator with a grant or a denial based on the determined spectrum availability, and controls the access point to provide wireless service according to the response to the service operator.

15 Claims, 12 Drawing Sheets

(56) References Cited

U.S. PATENT DOCUMENTS

| | | | |
|---|---|---|---|
| 2004/0037258 A1 | 2/2004 | Scherzer et al. | |
| 2004/0054774 A1 | 3/2004 | Barber et al. | |
| 2004/0063455 A1 | 4/2004 | Eran et al. | |
| 2005/0059396 A1 | 3/2005 | Chuah et al. | |
| 2005/0090255 A1 | 4/2005 | Kuchibhotla et al. | |
| 2005/0135317 A1 | 6/2005 | Ware et al. | |
| 2007/0025379 A1 | 2/2007 | May et al. | |
| 2007/0104165 A1 | 5/2007 | Hanaoka et al. | |
| 2008/0037484 A1 | 2/2008 | Sugiura | |
| 2008/0089305 A1 | 4/2008 | Yao et al. | |
| 2008/0186933 A1 | 8/2008 | Willman et al. | |
| 2008/0316997 A1 | 12/2008 | Zeng et al. | |
| 2009/0080388 A1 | 3/2009 | Rohfleisch et al. | |
| 2010/0014415 A1 | 1/2010 | Moeller | |
| 2010/0061300 A1 | 3/2010 | Hunziker | |
| 2010/0220665 A1 | 9/2010 | Govindan et al. | |
| 2010/0332647 A1 | 12/2010 | Agulnik et al. | |
| 2011/0103284 A1 | 5/2011 | Gundavelli et al. | |
| 2011/0116489 A1 | 5/2011 | Grandhi | |
| 2011/0188487 A1 | 8/2011 | Seok | |
| 2011/0194407 A1 | 8/2011 | Ji et al. | |
| 2011/0199919 A1 | 8/2011 | Lin et al. | |
| 2011/0205941 A1 | 8/2011 | Stanforth | |
| 2011/0250915 A1* | 10/2011 | Stanforth | H04W 16/14 455/509 |
| 2012/0106364 A1* | 5/2012 | Kasslin | H04W 16/14 370/252 |
| 2012/0120887 A1* | 5/2012 | Deaton | H04W 16/14 370/329 |
| 2012/0165059 A1* | 6/2012 | Schmidt | H04L 1/0016 455/513 |
| 2012/0170507 A1 | 7/2012 | Sawai | |
| 2012/0250659 A1 | 10/2012 | Sambhwani | |
| 2012/0252508 A1* | 10/2012 | Uusitalo | H04W 16/14 455/500 |
| 2012/0315916 A1 | 12/2012 | Van Phan et al. | |
| 2013/0003689 A1 | 1/2013 | Kwon et al. | |
| 2013/0083661 A1 | 4/2013 | Gupta et al. | |
| 2013/0088983 A1 | 4/2013 | Pragada et al. | |
| 2013/0163463 A1 | 6/2013 | Grayson et al. | |
| 2014/0087736 A1 | 3/2014 | Shoshan et al. | |
| 2014/0092723 A1 | 4/2014 | Murphy et al. | |
| 2014/0119186 A1 | 5/2014 | Wong et al. | |
| 2014/0254471 A1 | 9/2014 | Fang et al. | |

FOREIGN PATENT DOCUMENTS

| | | |
|---|---|---|
| CN | 102625317 A | 8/2012 |
| WO | 2011/019975 A1 | 2/2011 |

OTHER PUBLICATIONS

Chinese Office Action dated Jan. 5, 2017 for Chinese Patent Application No. 201410087871.1, filed on Mar. 11, 2014 (6 pages).
Chinese Office Action dated Jul. 19, 2018 for Chinese Patent Application No. 201310745776.1, filed on Dec. 30, 2013 (9 pages).

* cited by examiner

INTEGRATED WIRELESS LOCAL AREA NETWORK FOR SPECTRUM SHARING

CROSS REFERENCE TO RELATED APPLICATIONS

This patent document is a divisional of and claims priority to U.S. patent application Ser. No. 14/145,690, filed on Dec. 31, 2013, which claims the benefit of priority under 35 U.S.C. § 119(a) and the Paris Convention of International Patent Application No. PCT/CN2012/088102, filed on Dec. 31, 2012. The entire contents of the before-mentioned patent applications are incorporated by reference as part of the disclosure of this application.

BACKGROUND

This patent document relates to wireless communications.

With the increased popularity of wireless devices as the user device of choice for accessing the Internet, the bandwidth demand on wireless networks has significantly increased in the last few years. Many wireless devices, e.g., smartphones, e-readers and tablets, often have radio frequency (RF) capability of receiving and transmitting on multiple different wireless networks such as 802.11x local area networks and cellular wireless wide area wireless networks. Therefore, the increased bandwidth demand is felt in places that may be simultaneously served by multiple different wireless networks.

SUMMARY

This document describes architecture, techniques, systems, devices, among the other things, for spectrum sharing in wireless communications. The described techniques, called integrated wireless local area network (iWLAN) techniques, can be used for facilitating sharing of the wireless medium among multiple wireless access services, reducing interferences and improving wireless medium usage efficiency.

In one aspect, techniques are provided for integrating multiple radios into one network entity, each of which can be operating independently on a different channel in license exempt bands or authorized shared access spectrum, and forming a basic service set (BSS). Therefore an integrated WLAN can offer multiple overlaid BSS over the same coverage area.

In another aspect, techniques are provided for using the integrated WLAN for spectrum sharing among multiple wireless services operating on the same frequency channel in the same area via sharing a BSS associated with multiple different SSIDs, which helps to improve the medium usage efficiency.

In addition, techniques for balancing loads across vertical BSSes operating on different frequency channels are provided to optimize the network usage and performance, which in turn helps to improve user experience.

In another aspect, techniques are provided for managing the operation of integrated WLAN through integrated WLAN Access Gateway (iWAG) such as allocating, switching or removing operating frequency channel(s) in license exempt band or in authorized shared access spectrum so as to maximize use of available spectrum in the coverage area.

In addition, techniques are provided for using iWAG to virtualize radio resources of iAP for configuration, administration and management functionalities of iWLAN, This virtualized radio resource management could be extended as a part of core network Operation, Administration and Maintenance (OAM) function or operating as an independent functionalities from the core network OAM system.

In another aspect, techniques are provided for stations to fast scan the radio channels being operated by iWLAN.

In yet another aspect, examples of network architecture of integrated WLAN, diagrams of integrated access point and etc are provided to illustrate how to perform spectrum sharing in different situations.

The details of above, and other, aspects and their implementations are set forth in the accompanying drawings, the description and the claims.

DETAILED DESCRIPTION

Figure 1:
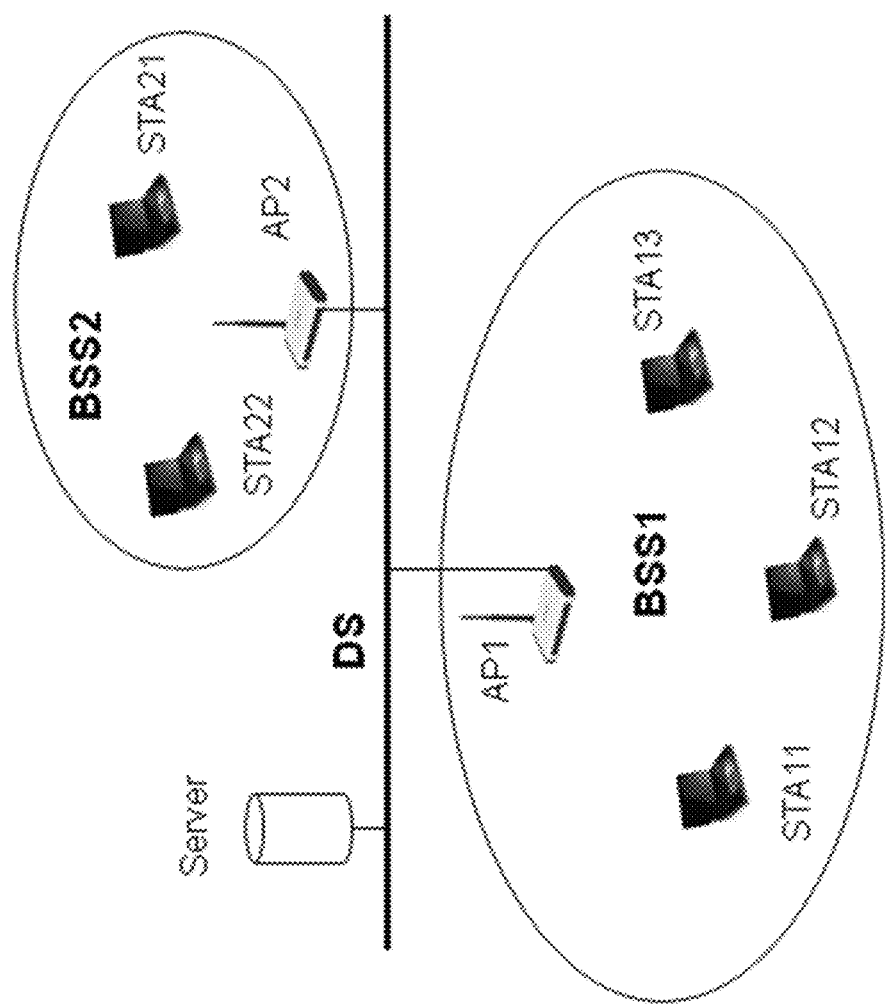
FIG. 1 shows an example of an infrastructure BSS in a wireless communication system.

This patent document describes the architecture, techniques, mechanisms, systems and devices of integrated WLAN (iWLAN) for spectrum sharing in wireless communications.

Wireless communication systems can include a network of one or more access points (AP) that are configured to communicate with one or more wireless stations (STA). An access point can emit radio signals that carry management information, control information or users' data to one or more wireless stations. An STA can also transmit radio signals to an AP in the same frequency channel via time division duplexing (TDD) or in different frequency via frequency division duplexing (FDD).

For the ease of the subsequent description, wireless communication networks can be categorized as (loosely based on the physical reach of the wireless signals):
  i. wireless wide area network (WWAN)
  ii. wireless local area network (WLAN)
  iii. wireless personal area network (WPAN).

A WWAN may be a type of cellular networks such as using Code division Multiple Access (CDMA) or other wireless technologies. A traditional cellular network is built for voice services and evolves to offer circuit and packet data services. The cellular network is typically coverage orientated and has to provide enough wide coverage so that the voice and data services can be used by subscribers in major areas.

As smarts phones and other portable devices like iPads, notebooks, netbooks are widely used by a lot of people, mobile data traffic increases dramatically in cellular networks over last several years. In some market, a few percent smart phones consume a large percent of total data traffic of cellular network. This data traffic continues growing as many internet applications are developed and used by those devices, which is causing cellular network congestion especially in hotspot areas (i.e., high density of users).

Although 4G evolved Universal Mobile Telecommunications System (UMTS) Terrestrial Radio Access (E-UTRA) cellular network is being deployed nationwide in some countries, it may still not meet the mobile data traffic demanding. In some high density hotspots, like airports, shopping malls, data throughput over 4G cellular network might be below the expectation. As more people rely on mobile devices to access various applications or data in the Internet, it continues creating a huge data transmission capacity demanding on cellular networks, which is changing traditional wireless network investments from coverage to capacity in next generation of wireless networks.

New wireless service providers such as existing cable TV operators or fixed access operators or other Internet service providers would like to extend their existing services to wireless access for enterprise wireless services or public wide area wireless services such as in-airport free wireless access for convenience to transit passengers, public transportation information broadcasting, connecting to government's devices such as curbside parking meters, closed circuit television (CCTV) monitoring systems, emergency response etc. These service providers could either operate using some spectrum from government authority or use license exempt spectrum for wireless services. The latter might be more attractive especially for hotspot like coverage.

A WLAN, on the other hand, may link two or more stations in the small (e.g., up to 300 to 500 meters) radio coverage area and provides a connection to the Internet through an access point. An access point and a wireless station can communicate based on, e.g., one of the IEEE 802.11 specification suite.

IEEE 802.11 is an asynchronized time division duplexing technology designated for WLAN. The basic unit of WLAN is a basic service set (BSS). An example is depicted in FIG. 1. The infrastructure BSS is the BSS with stations through associating with an Access Point (AP) to connect to the wired network or Internet. In a BSS, both access point and stations share the same frequency channel and use CSMA/CA, a kind of TDD mechanism, for data transmission.

In IEEE 802.11, wireless stations (also called stations, e.g., STA11, STA12, STA 13, STA21, STA22 in FIG. 1) associated in the radio coverage area establish a BSS and provide basic service of WLAN.

A central station associated by other stations and dedicated to manage the BSS is referred to as an Access Point (AP). A BSS built around an AP is called an infrastructure BSS. FIG. 1 illustrates an example of infrastructure BSS. BSS1 and BSS2 are two infrastructure BSSes formed by two APs. BSS1 contains one access point (AP1) and several non-AP stations, STA11, STA12, and STA13. The AP1 maintains associations with stations STA11, STA12, and STA13. BSS2 contains one access point (AP2) and two non-AP stations, STA21 and STA22. The AP2 maintains associations with stations STA21 and STA22. Infrastructure BSS1 and BSS2 may be interconnected through backhaul of AP1 and AP2 or connected to a server through a distribution system (DS).

In some embodiments, an integrated WLAN (iWLAN), further described in greater detail, could be used to address issues in existing WLAN deployment through integrating multiple APs in one physical entity and coordinating them for spectrum sharing among multiple wireless services. In some embodiments, the iWLAN can avoid or reduce air link signal contention among different wireless networks via the coordination of radio networks. In various embodiments, iWLAN could reduce the hidden node possibility, improve the spectrum usage efficiency via sharing the common overhead information transmission from multiple service providers, integrate the backhaul connections, balance load across non-contiguous channels, and support Authorized Shared Access.

Figure 2:
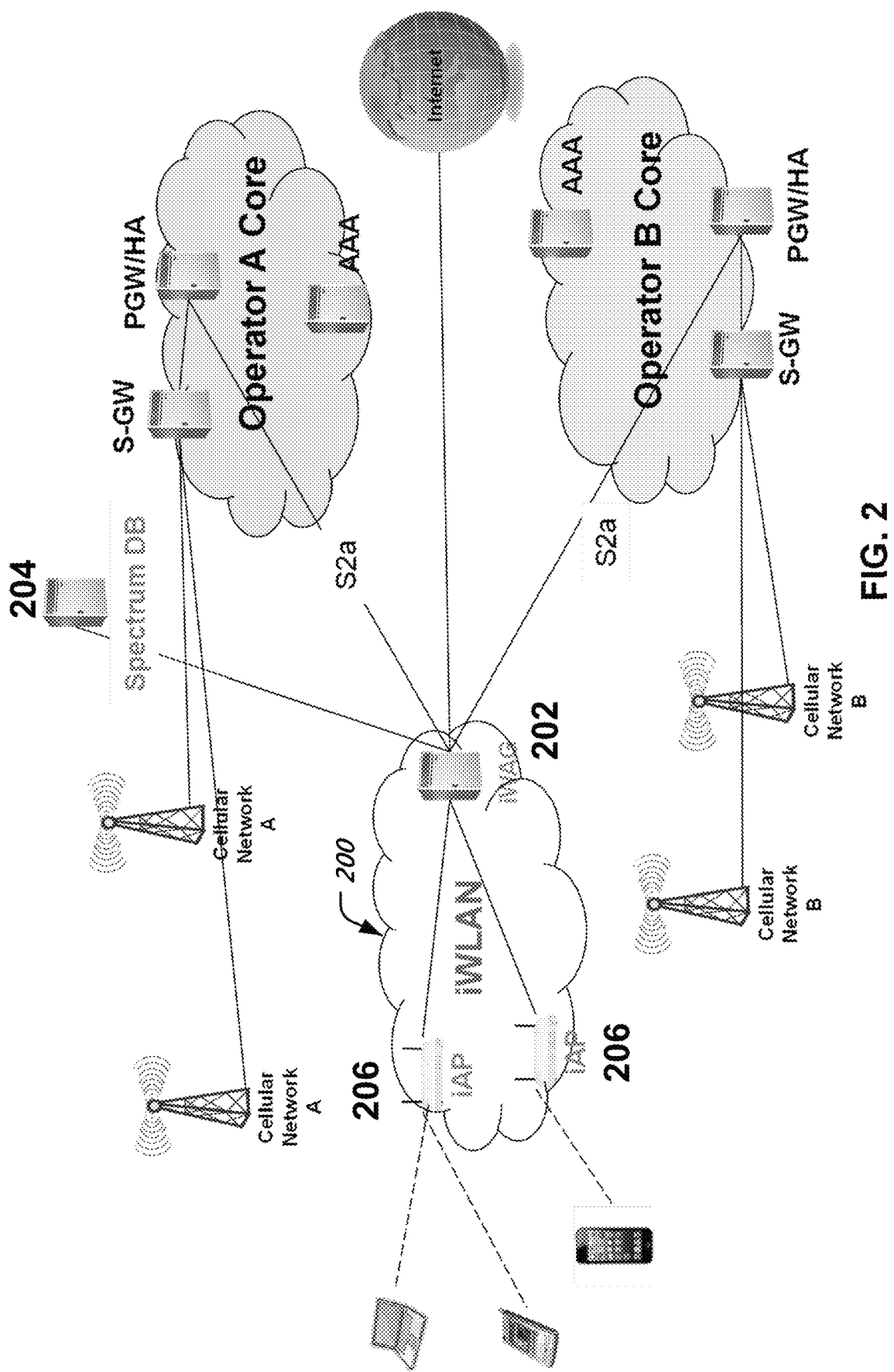
FIG. 2 shows an example architecture in which iWLAN is attached to multiple cellular networks.

FIG. 2 illustrates an example of iWLAN architecture 200 communicatively attaching to two cellular Core networks. The cellular network consists of network entities such as Base Stations (BS) or (e)NodeB, Base Station controller (BSC) or Radio Network Controller (RNC), Serving Gateway (S-GW), Packet Data Network Gateway (P-GW) or Home Agent (HA), and Authentication-Authorization-Accounting (AAA) server.

In some embodiments, the iWLAN is connected to cellular Core networks through iWAG 202 over a suitable interface such as the S2a interfaces. The iWLAN 200 can operate on either license exempt spectrum or authorized shared access spectrum to provide wireless access services. If operating on the authorized shared access spectrum, iWLAN could offer cellular operators/customers the wireless access services as the secondary users of the authorized shared access spectrum.

The iWLAN 200 may include the following network entities.

a) Authorized Shared Access Spectrum Database Server (ASAS-DBS) 204

In a traditional spectrum licensing model, wireless operators have to license the spectrum from a government authority before operating wireless services on the particular frequency band. Due to limited spectrum suitable for mobile wireless, there is not much new spectrum available for licensing. Therefore a new spectrum licensing model could be used to share the authorized or licensed spectrum between primary wireless service providers and secondary wireless service providers. In the authorized shared access spectrum model, when the primary wireless service is not operated on the authorized spectrum, the secondary services could be allowed to operate on the authorized shared access spectrum to their customers. In this way, the limited spectrum resource could be re-used in an optimized and efficient way.

In order to support the authorized shared access for spectrum sharing, the Authorized Shared Access Spectrum Database Server (ASAS-DBS) 204 in the iWLAN network is used to record the authorized spectrum information and its operation status such as:

A) Authorized shared access spectrum frequency band and channel information

B) Authorized shared access spectrum geo-location information

C) Allowed maximum transmit power in the authorized shared access spectrum

D) Primary service provider information

E) Secondary service provider information

F) Primary service provider operation status and scheduled operation information G) Current operation status of the authorized spectrum.

In some embodiments, the iWLAN 200 supports the authorized shared access model through ASAS-DBS 204. Both the primary wireless service and secondary wireless service(s) are required to store their service information in the ASAS-DBS first. During the primary service operation on the authorized access spectrum, the primary wireless service updates the ASAS-DBS and indicates the authorized shared access spectrum is taken in the particular geo-location area. This is useful to prevent other services from operating on the authorized spectrum.

When a secondary service(s) wishes to operate on the authorized shared spectrum, the iWAG 202 representing multiple secondary wireless services queries the ASAS-DBS 204 to get available authorized shared spectrum information based on geo-location and time. If the authorized shared spectrum is not taken in particular geo-location for the time being, the iWAG 202 will enable the secondary wireless services over the authorized shared spectrum indicated by ASAS-DBS 204 for the time of operation that is not scheduled for the primary wireless service. If ASAS-DBS 204 indicates that the authorized shared spectrum is being occupied by the primary wireless service, the iWAG 202 does not enable the secondary wireless access services on the authorized shared spectrum.

In some embodiments, the iWAG 202 periodically queries the ASAS-DBS 204 to get the updated usage information of authorized shared spectrum for multiple secondary services. When iWAG 202 receives the response from ASAS-DBS 204 that the primary wireless service is going to operate over the authorized shared spectrum that is currently taken by the secondary wireless services, the iWAG 202 could stop the operation of secondary services on the authorized shared spectrum and return the authorized shared spectrum to the primary service. Otherwise, when the ASAS-DBS 204 responds no primary wireless service is going to operate on the spectrum for that geo-location, the iWLAN 200 may continue operating on the authorized shared access spectrum as the secondary user.

The ASAS-DBS 204 may also autonomously notify iWAG 202 the authorized shared spectrum status change through interface between iWAG 202 and ASA-DBS 204. If the authorized shared spectrum is to schedule for the primary wireless service, ASA-DBS may send the notification to iWAG 200 to stop operation of secondary wireless services over the authorized shared spectrum. This allows un-scheduled primary wireless service to take priority over the secondary wireless service over the authorized shared access spectrum band at any time.

b) Integrated WLAN Access Gateway (iWAG) 202 iWAG 202 is the gateway of iWLAN 200 connecting to one or more cellular core networks or other wireless core networks or the Internet in the example.

iWAG 202 can be a functional entity within the integrated Access Point iAP 206, or can be an independent physical network entity deployed in iWLAN 200. An independent iWAG entity can provide centralized control and management function of iWLAN. When all the iAP traffic are forwarded to iWAG, it could cause some potential congestion in the independent/centralized iWAG. As wireless technology evolves to very high throughput such as IEEE 802.11n and IEEE 802.11ac which could reach up to 300 Mbps and 1 Gbps respectively, the centralized iWAG could become a bottleneck of wireless LAN. Therefore an alternative approach in some implementation is to distribute the iWAG function into multiple iAPs 206.

iWLAN 200 can be considered as integrating multiple virtual wireless pipes, each of which is connecting to a cellular Core network. The iWAG as a gateway of iWLAN can provide the virtualized capability to manage (create, assign, change, remove) these virtual pipes. In addition, iWAG can virtualize AP resources and expose one set or multiple sets of virtualized resources to one core network entity or multiple core network entities. iWAG is capable of managing these virtualized resources and rent one set or multiple sets of resources to one or multiple core network entities. iWAG can also provide configuration, management and verification functionalities to those virtualized resources of iWLAN independently from the cellular networks' OAM system. It could make iWLAN to be completely transparent from cellular operators and could be operated by a third party wireless service provider.

In some implementations, the iWAG 202 can determine operating frequencies of iAP in the particular geo-location and time period.

A) For operating on ISM (industrial-scientific-medical) bands (license-exempt spectrum) such as 2.4 GHz or 5 GHz, iWAG may instruct iAP to scan channels in those bands to determine the channel occupancy by the surrounding neighbor stations. Alternatively, the iWAG may perform this task by itself. Based on the scan result, iWAG instructs iAP to operate on one or more frequency channel(s) which are less congested or not occupied by neighboring stations. In this way, it could help to avoid or reduce the interference from neighboring BSS.

B) For operating on the authorized access spectrum, iWAG queries the ASAS-DBS to get the ASA spectrum usage status for the particular geo-location and time interval. If the ASAS-DBS indicates the primary wireless service does not schedule to operate in this interval, iWAG could enable iAP(s) to operate the frequency channel indicated by ASAS-DBS to provide wireless access service. Otherwise, iWAG instructs iAP(s) not operating on ASA bands.

Figure 3:
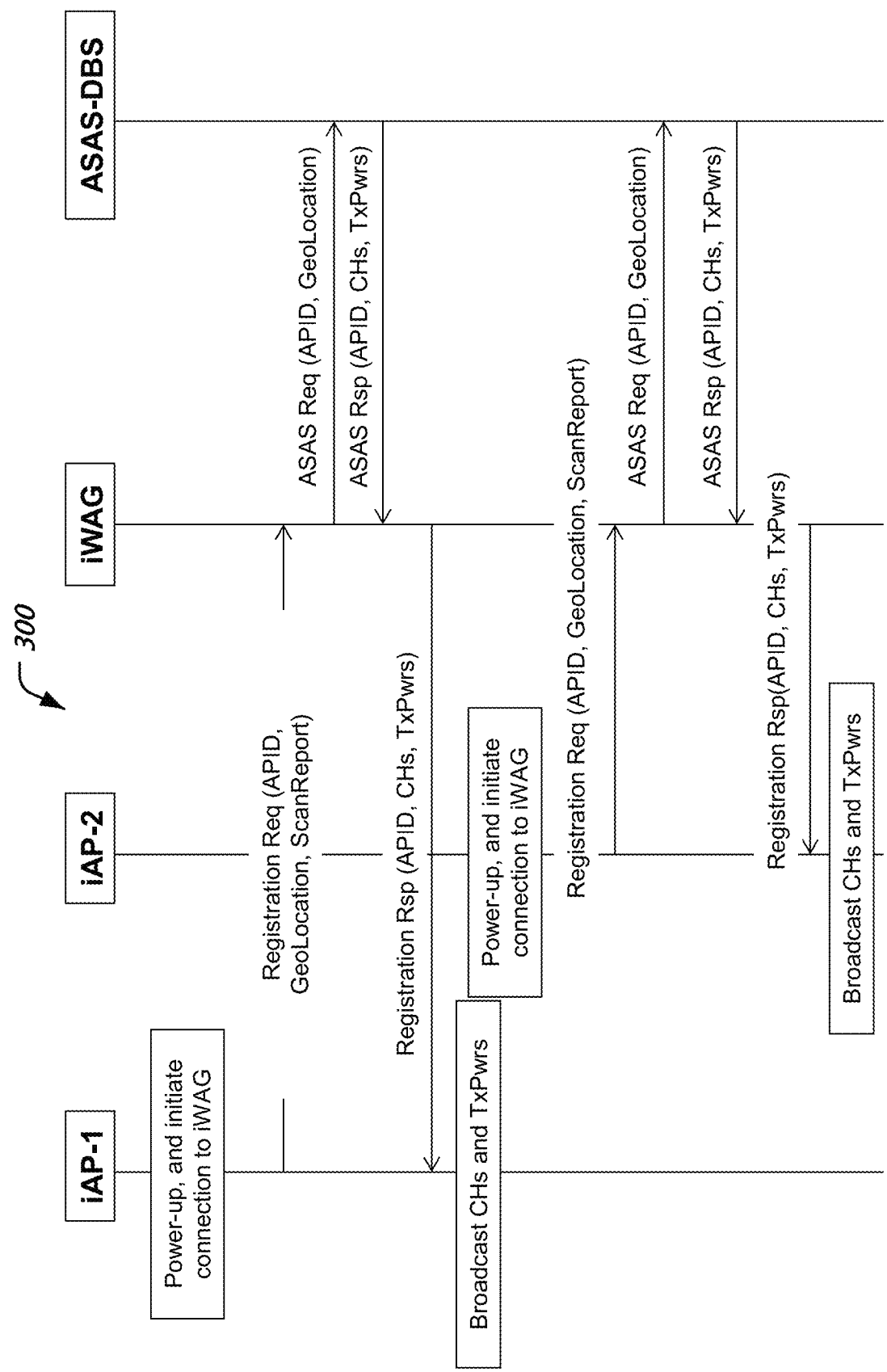
FIG. 3 shows an example of a procedure 300 of selecting operating channels in ASA band.

FIG. 3 shows an example message exchange procedure 300 of selecting the operating frequency channels. When an iAP (iAP-1) is powered up, it initiates a connection to iWAG over its backhaul link (which may be wired or may be in a wireless spectrum controlled based on one of the techniques disclosed herein), and sends a Registration Request message to iWAG including its APID, geo-location information and the ISM channel scanning report. After receiving this message, iWAG sends an ASAS Request message to ASAS-DBS to get the permitted channel information and transmit power at the geo-location and time period. Once the iWAG receives this information in ASAS Response message from ASAS-DBS, it selects the best operating channels in ISM bands and/or channels in ASA bands for the iAP in terms of channel capacity, loading information and access delay information. When operating on ASA bands, iWAG instructs iAP-1 to set maximum transmit power to a pre-specified value to control the radio interference in coverage area according to the information received from the ASAS-DBS, and have iAP to broadcast the maximum transmit power information to stations. The stations operating on ASA frequency band restrict their transmit power according to the received maximum transmit power information. Then iWAG sends to iAP-1 the Registration Response message including the operating channels in ISM bands and in ASA bands with corresponding maximum transmit power information.

If another iAP (iAP-2) is powered up, it repeats the same operating channel selection procedure to determine the best channels for iAP-2.

iWAG may record the channel information and corresponding transmit power information for every connected iAP locally.

iWAG may periodically query ASAS-DBS to update the status of ASA spectrum operation schedule information. If iWAG is notified that the primary wireless service will be turned on the frequency channel that it currently used by iWLAN, iWAG will schedule to shutdown iAP(s) and return the frequency channel(s) back to the primary wireless service.

In some embodiments, the iWAG manages and controls the iWLAN to be shared among multiple cellular networks for data traffic offloading from macro cells. As the gateway (or a forwarding functional entity) between iAP and Evolved Packet Core (EPC), iWAG connects iAP to EPC through the PDN Gateway over S2a interface, and could route the traffic from P-GW to iWLAN according the cellular operators' policy control so as to reduce the load of cellular networks.

In some embodiments, the iWAG can also include a proxy functional entity connecting to AAA server in EPC through the STa interface to provide the authentication, authorization and accounting services for every wireless station roaming to the iWLAN. When a wireless station is going to attaching to iWLAN, it initiates the authentication request over iWLAN to perform authentication with its home network to get authorization of operation in iWLAN. When iWAG receives the authentication request message, it checks the security information contained in the message such as EAP-SIM, etc. to get its home AAA information of the wireless station, and then forwards the message to its home AAA. If the wireless station is authenticated, it is allowed to associate with the iAP to get wireless access service.

In some embodiments, e.g., an enterprise or a government controlled network, the iWAG is implemented as a (or functional) gateway connecting iWLAN to the wired networks.

In some embodiments, e.g., networks for public access, iWAG is the actual or functional gateway of iWLAN to the Internet and control the access to Internet.

The iWAG can balance traffic amongst iAPs in the iWLAN. iWAG collects the load information of iAPs either periodically or being triggered by loading condition. If the iWAG is indicated that a particular iAP is overloaded, it can send an instruction to the overloaded iAP to redirect its associated stations to the neighboring under-loaded iAP(s) with the collected load information. iAP may use the load information of neighboring iAP(s) and radio signal measurement from its associated stations to determine how to redirect each associated station to other iAP(s).

In some embodiments, the iWAG can assist and control a wireless station handoff from one iAP to another iAP. When a wireless station is moving out of radio coverage of a currently serving iAP and detects the beacon signal transmitted from adjacent iAP, the wireless station may initiate re-association process with the new detected iAP via including its current association information and security information in the association request message. The new iAP may trace the association and security information directly through iWAG based on the included association and security information, instead of performing another authentication process with the home network of handoff wireless station. In this way, it would speed up the re-association process and reduce the handoff time from one iAP to another.

In some embodiments, the iWAG can control and prioritize emergency telecommunication services. For example, when iWAG receives an emergency alert message from a wide area source, the iWAG may broadcast the message to all iAPs in the iWLAN, and iAP will further broadcast to all wireless devices being served.

In addition, as the gateway of iWLAN, iWAG connected with different wired networks can control the radio link connection admission in individual basis or group basis using white list or black list. When a new connection is setup, iWAG will check the MAC address of the station to be associated with in the white list and black list. If the MAC address of the station is found in the white list, the iWAG would allow the connection. If the MAC address of the station is found in the black list, the iWAG will disconnect the connection from the station.

c) Integrated Access Point (iAP) 206 iAP can be a carrier grade central station of integrated WLAN which can be associated by multiple IEEE 802.11 stations. An iAP connected to iWAG in an iWLAN provides radio access to wireless stations. The iAP can be configured to manage and operate multiple basic service sets (BSS) in same or different frequencies simultaneously. Each of BSS could become a part of radio network connecting to one or more wired core networks.

Figure 4:
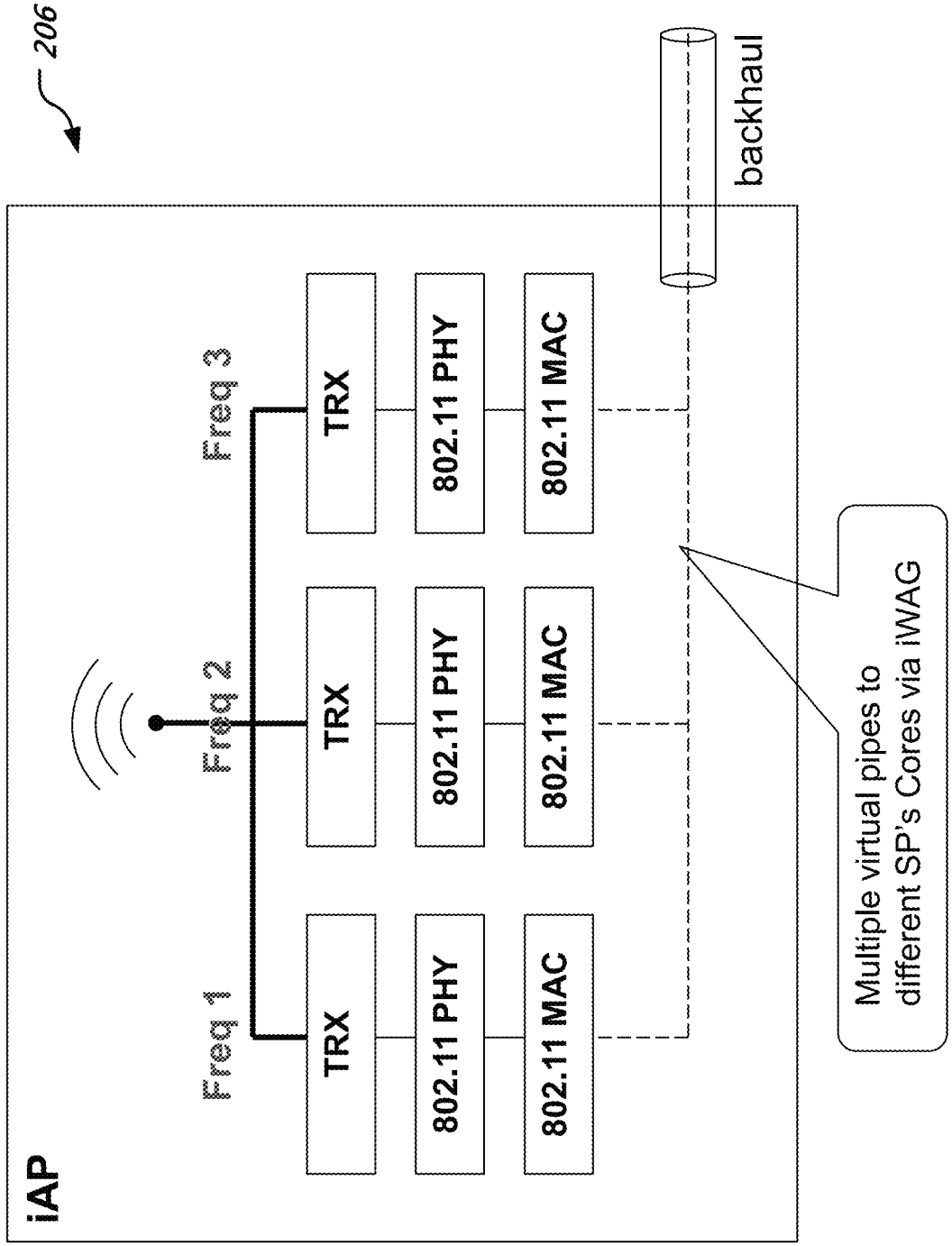
FIG. 4 shows an example architecture of an integrated Access Point (iAP).

FIG. 4 shows an example of integrated Access Point (iAP) architecture. An integrated radio station iAP can include one or more individual communication interfaces for transmitting and receiving data over the radio links at same time, such as three individual IEEE 802.11 access points (AP) in the example. Those individual APs are integrated into single integrated radio station iAP and may share the common electronics such as antenna (array), general processor, memory and/or backhaul. Each AP of the integrated radio station iAP can operate on its own TRX, PHY and MAC independently.

An iAP can include processor electronics such as a microprocessor that implements methods such as one or more of the techniques presented in this document, and one or more memories configured to store information such as data and/or instructions.

In some implementations, an integrated radio station iAP can include one or more wired communication interfaces to communicate with one or more wired networks.

In the example of FIG. 4, iAP can be configured to form three BSSes. Each BSS can operate on same or different wireless channel either in a license exempt frequency band or an authorized shared access frequency band.

In the independent deployment scenario of iWAG, an iAP uses a single backhaul link to the iWAG connecting to one or multiple wired networks. In other word, the multiple wireless core networks could share the "last mile" backhaul link to an iAP. In the distributing model, the iWAG function can be integrated into iAP and the connection between iAP and iWAG becomes internal link.

Figure 5:
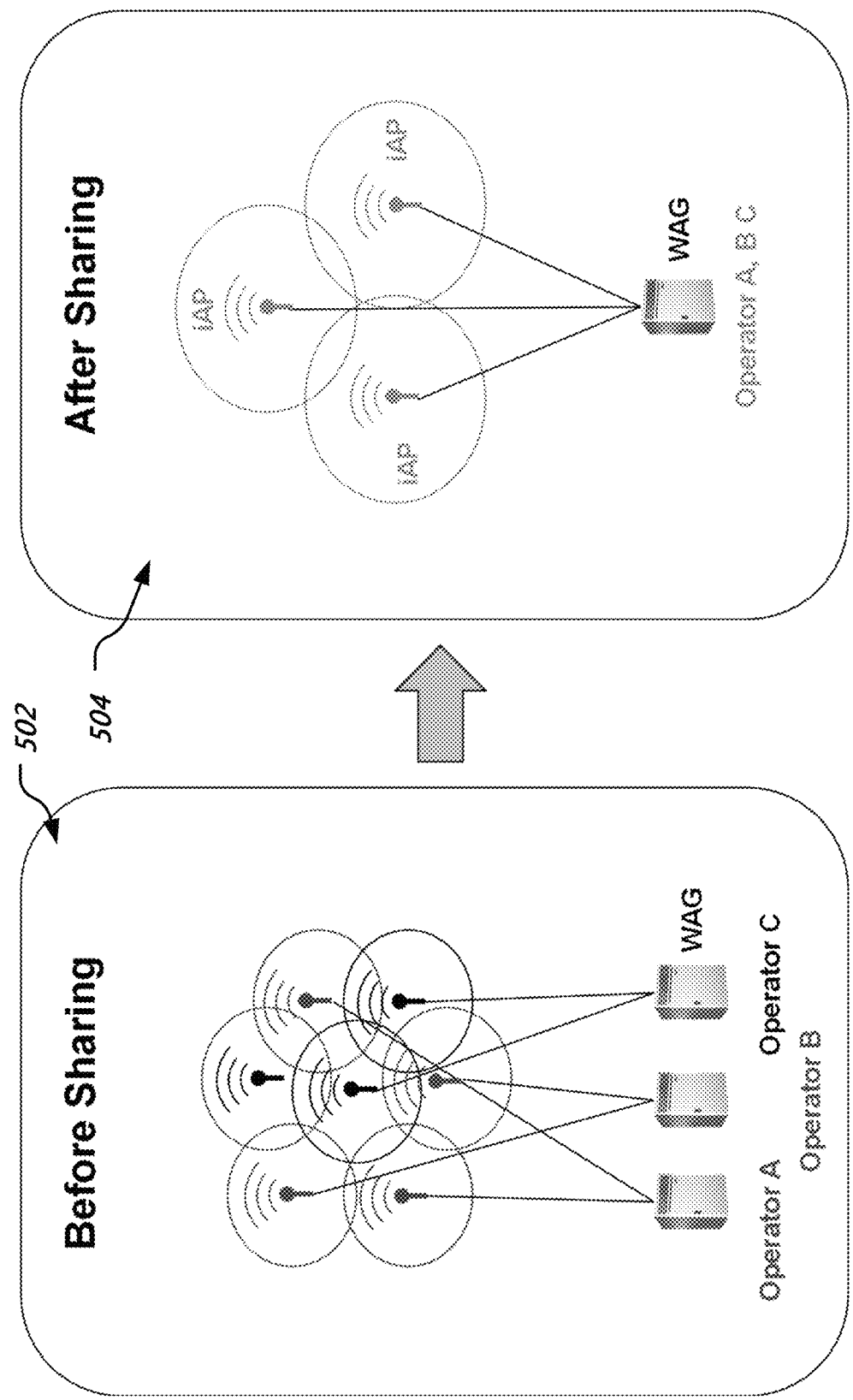
FIG. 5 shows an example of an iAP shared by multiple wired Core networks.

FIG. 5 illustrates an example that multiple cellular networks share iAPs for reducing backhaul connection and simplifying WLAN deployments. Before the iAP sharing, each operator may deploy its own WLAN network in hotspots independently and individually (502) and use their own wireless access gateways (WAGs) for connecting Access Points to the operator's network. Multiple operators may repeat the deployment in the same region. When the sharing is allowed, multiple operators could share the same iAP deployment in same hotspots to offer shared wireless access in license exempt frequency bands or authorized shared access spectrum (504). In this way, the deployment could be simplified and "last-mile" backhaul link could be reduced. In addition, the shared radio mechanism in iAP helps to reduce interferences generated from multiple individual APs in wireless service providers or cellular operators' offload networks.

An iAP can be extended as a part of LAN or WAN in multiple cellular operator/wireless service provider networks. Each BSS created by iAP can be shared among one or more wireless service providers to offer the wireless access in the same area.

Figure 6:
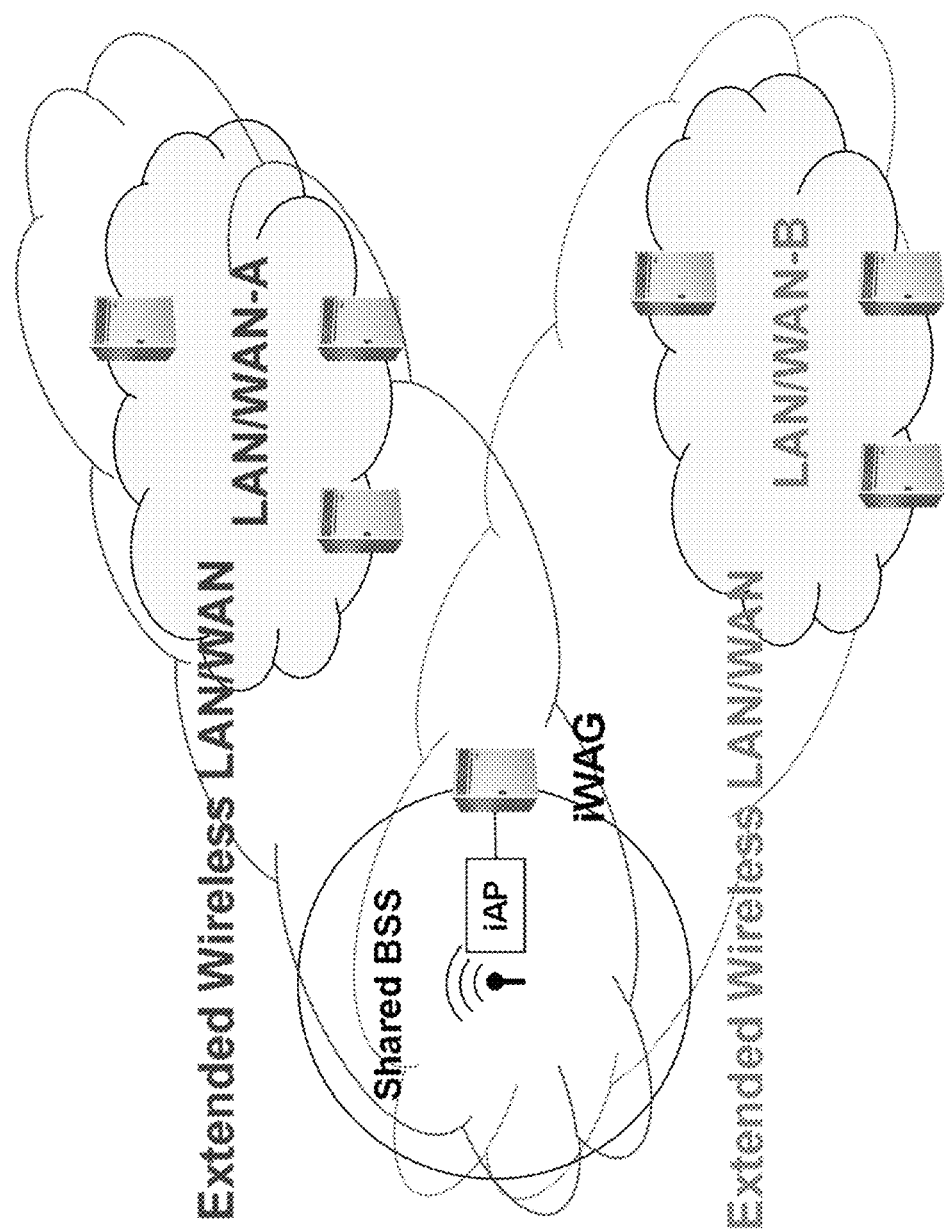
FIG. 6 shows an example of BSS shared by multiple wireless services to form shared wireless LAN/WANs.

FIG. 6 shows an example of a BSS shared by two service providers to form multiple wireless LAN/WAN. The LAN/WAN-A can include iWLAN to extend its networking. LAN/WAN-B can also extend its networking via including iWLAN. iWLAN provides medium sharing between extended LAN/WAN-A and LAN/WAN-B via sharing the same BSS of iAP operating on license exempt frequency bands or authorized shared spectrum.

The shared BSS of iAP allows to include one or more SSIDs, each of which is used to identify wireless access service in the area. Different wireless service provider may use different SSID on the shared BSS of iAP. For example, the operator A may choose OPA-WiFi as its SSID, and operator B may choose OPB-WiFi for the shared BSS of iAP. In some embodiments, the iAP will broadcast two SSIDs information within one beacon.

The shared BSS of iAP provides radio sharing in license exempt spectrum band or authorized shared spectrum among multiple cellular operators and service providers. An iAP periodically broadcasts a beacon frame that allows one BSSID associating with one or more SSIDs of different cellular operators/wireless service providers, and includes common information about BSS of iAP shared by all the cellular operators/wireless service providers.

Figure 7:
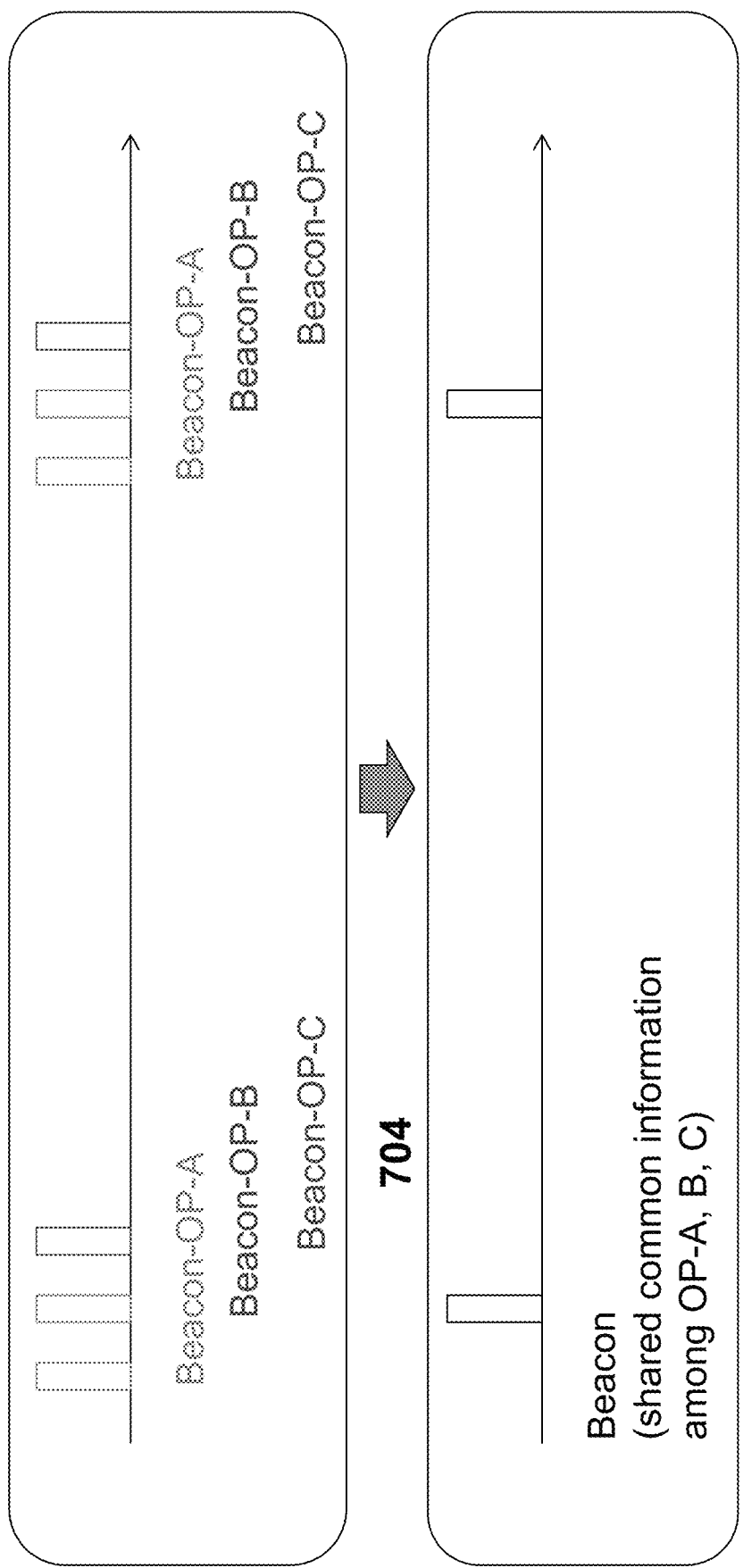
FIG. 7 shows an example of sharing common information in iAP's beacon transmission.

FIG. 7 shows an example of beacons transmission by multiple APs individually deployed by service providers (702) and the beacon transmission by iAP over a shared BSS (704). To provide basic wireless service, the access point needs to periodically broadcast beacon signal that carries the basic configuration and capability information of the access point. If an access point is deployed by individual wireless service provider or cellular operator in the same area, each AP has to broadcast beacon signal periodically to carry the information of BSS. Since most certified AP may have same or similar characteristic, many contents of beacons could be same. This would cause many duplicated information being transmitted over the same medium and reduce the spectrum efficiency.

In iAP case 704, however, a BSS is allowed to be bundled with multiple service sets. The information for multiple service providers such as a list of SSIDs can be combined and transmitted in single BSS beacon over a frequency channel. Therefore the shared BSS of iAP will reduce the number of beacons, FILS Discovery (FD) frames or management frames sent in the medium for improving medium usage efficiency.

In IEEE 802.11 wireless communications, the network discovery takes significant time in the first initial link setup. To discover an AP, a station can use either passive scan or active scan to discover the radio frequency channels in the coverage area. For the passive scan, the station tries to detect beacon signal transmitted from AP(s) to find out the existence of AP(s) based on pre-configured information such as network selection priority list or SSIDs. A beacon signal is broadcast periodically to carry the system information of AP. When a station detects a beacon, it knows the existence of AP and its system capability and configuration parameters. Then the station can start the authentication process to mutual authenticate with the AP. In the normal configuration, the beacon signal cannot be transmitted too often since it will take away of the air link capacity. In the license-exempt bands, 2.4 GHz and 5 GHz, it contains many overlapped or non-overlapped channels. Therefore it requires a quite long time to complete the passive scanning.

For the active scanning, a station can initiate the scan process by sending the Probe Request message. When an AP receives this message, it shall respond with a Probe Response with relative parameters for the station to associate with. The total active scan time is:

Total scan time=Number of scan operations×Time per scan operation.

Figure 8:
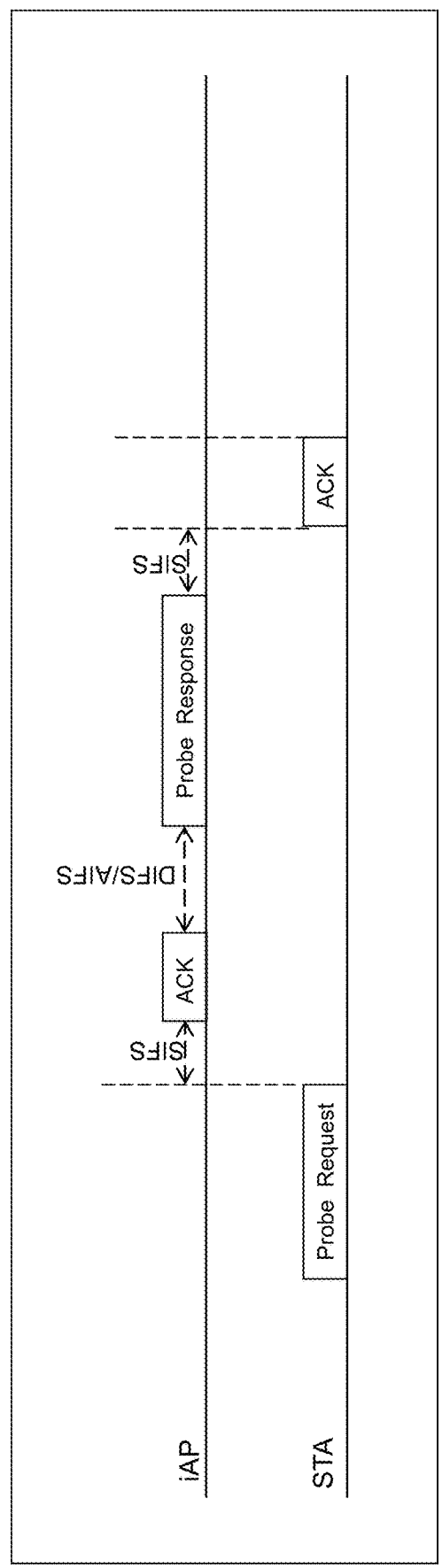
FIG. 8 shows an example of supporting fast active scan procedure of iWLAN.

FIG. 8 shows an example of fast active scan procedure of iWLAN. An iAP of iWLAN operates on a frequency channel and multiple service sets share the same radio link. If a station receives a MLME-SCAN.request primitive with a list of SSID, the station may not need to send multiple Probe Request frames, each of which contains one SSID in the list. Instead, the station can send a Probe Request frame with a wildcard SSID addressed to the individual address (DA=BSSID of iAP) or to a broadcast address. Once iAP receives the Probe Request, it responds an ACK first to indicate the existence of iAP and then sends a Probe Response to provide the information about the iAP including a list of SSIDs for the station to associate with on the frequency channel.

If an iAP operates on multiple frequency channels, the iAP can respond the information about other frequency channels in the neighbor information as well to speed up the active scanning procedure. For example, an iAP is configured to operate on two different frequency channels in license exempt bands, CH-1 and CH-2. The two frequency channels can have the same bandwidth such as 20 MHz or 40 MHz, or can have different bandwidth. During the fast active scanning, a station transmits a Probe Request over the primary channel on CH-1 addressed to an individual address (DA=BSSID of iAP) with a wildcard SSID. If the iAP receives a Probe Request, the iAP shall respond with an ACK over the receiving frequency channel (CH-1) and then send a Probe Response addressed to a broadcast address to provide the information about the iAP including the information on both CH-1 and CH-2 and a list of SSIDs.

In this way a station could use one pair of messages to quickly get information of multiple service sets of iWLAN on the particular frequency channel, and speed up the active scanning process.

Figure 9:
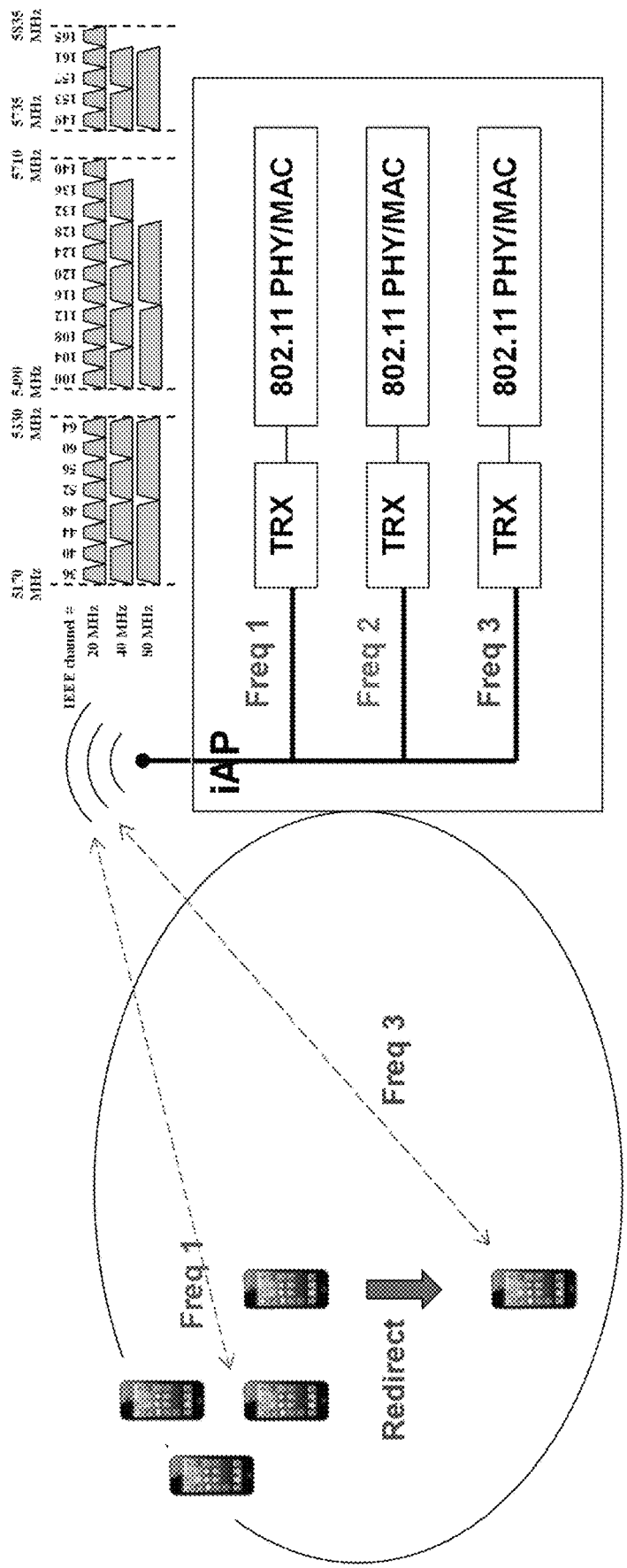
FIG. 9 shows an example of iAP for balancing loads across different channels and maximizing the user data throughput.

FIG. 9 illustrates an example of iAP for balancing loads across different channels and maximizing the user data throughput. Each AP function (TRX modules on Freq 1, Freq 2 and Freq 3) in iAP is configured to operate on a different frequency channel such as Frequency 1, Frequency 2 and Frequency 3 in the 5.170-5.330 GHz, 5.490-5.710 GHz and 5.735-5.835 GHz. These three APs may form three different BSSs: BSS1, BSS2 and BSS3 in the same coverage area. If many wireless stations associating with the iAP on the Frequency 1 cause iAP overloaded on Frequency 1, iAP could redirect some stations to under-loaded band such as Frequency 3 to balance the load over the entire operating spectrum.

In order to balance loads across discontinuous spectrum, each AP of iAP may measure the spectrum (time) occupancy and provides the measurement report to the control processor of iAP. If the control processor detects the spectrum occupancy reported by an AP higher than the given threshold and other spectrum occupancy reported as normal or underloaded, the control processor informs the overloaded AP to send to one or more stations a redirection message, including a list of non-overloaded frequency channel information, to suggest them to leave the current operating frequency channel toward the under-loaded frequency channels. In some implementations, the load is determined based only on the number of wireless devices being served, regardless of whether or not these wireless devices are currently actively performing user data transmission or reception. In one aspect, this way, control traffic overheads can be load balanced. In another aspect, the load balancing may meet prospective needs for bandwidth by these devices, when the user turns on a possibly bandwidth hungry application on his wireless device.

In some embodiments, the load balancing may take into account bandwidth utilization attributes of the STAs being served. For example, newer STAs, or certain types of STAs (e.g., an iPhone) may use a greater amount of wireless bandwidth than older STAs or STAs that have limited bandwidth use capability.

Alternative approach to redirecting stations to under-loaded frequency channel is that AP starts the de-association procedure with those stations, and forces them to leave the current operating channel and to search for a new AP in different frequency channel in the same coverage area.

Authentication is the process by which two stations to be communicating establish their mutual trust. iWLAN can use WPA-Enterprise or WPA2-Enterprise (EAP-SIM, EAP-AKA or EAP-FAST) authentication defined by IEEE 802.11 for the radio link sharing amongst different wireless enterprise or cellular service providers. Each wireless enterprise or cellular service provider can choose its own authentication algorithm to authenticate stations attaching to iWLAN.

Figure 10:
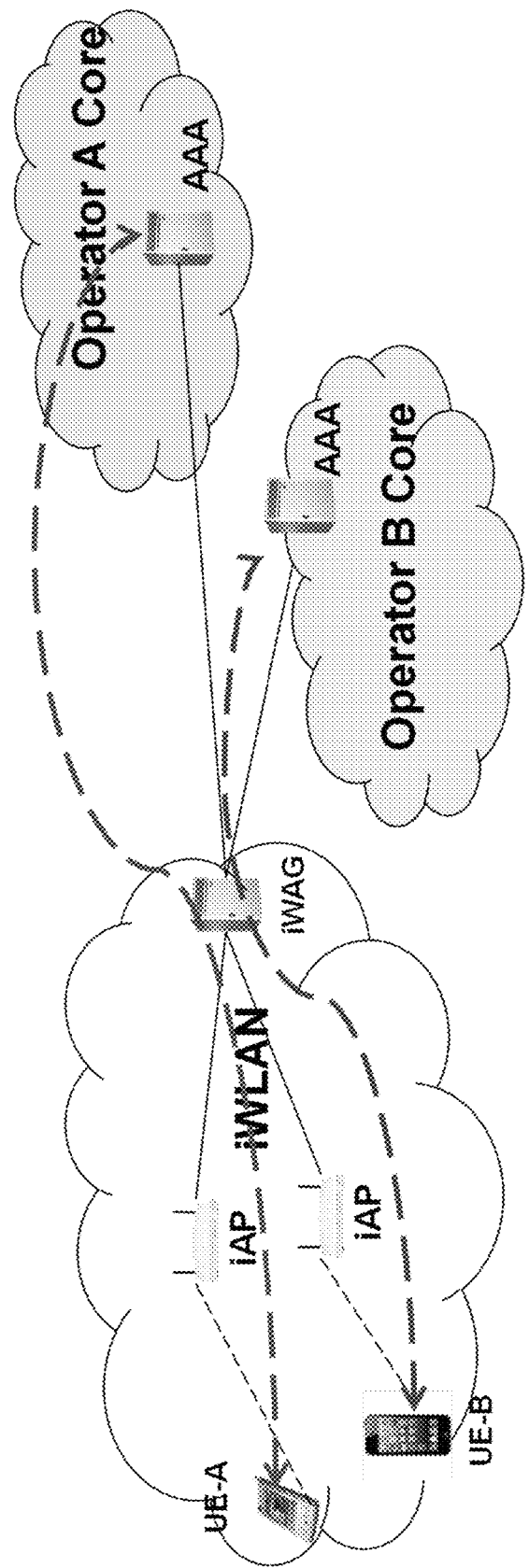
FIG. 10 shows an example of using the same authentication procedure in iWLAN for two subscribers in different home networks.

FIG. 10 shows an example of authentication of iWLAN in two different wired networks. After scanning the medium, a station that is going to attach to an iWLAN sends an Authentication Request message to iWLAN. In this document, a "station" refers to any wireless device, such as an STA device according to IEEE terminology or a user equipment (UE) according to 3GPP terminology, etc. According to the subscription information carried in the Authentication Request message, iWAP routes it through iWAG to the station's home Core network for authentication. In the example, the message from the station UE-A subscribed to Operator A is directed to OP-A AAA server for authentication, while the packet from the station UE-B subscribed to Operator B is directed to OP-B AAA server for authentication based on their subscription information carried in the message.

After the authentication is completed, iAP could use the TKIP or AES-CCN IP to encrypting data transmitted within iWLAN. The encryption key is derived from PTK during the authentication. Therefore, each station could have its own encryption key for data transmission in the shared radio link.

Figure 11:
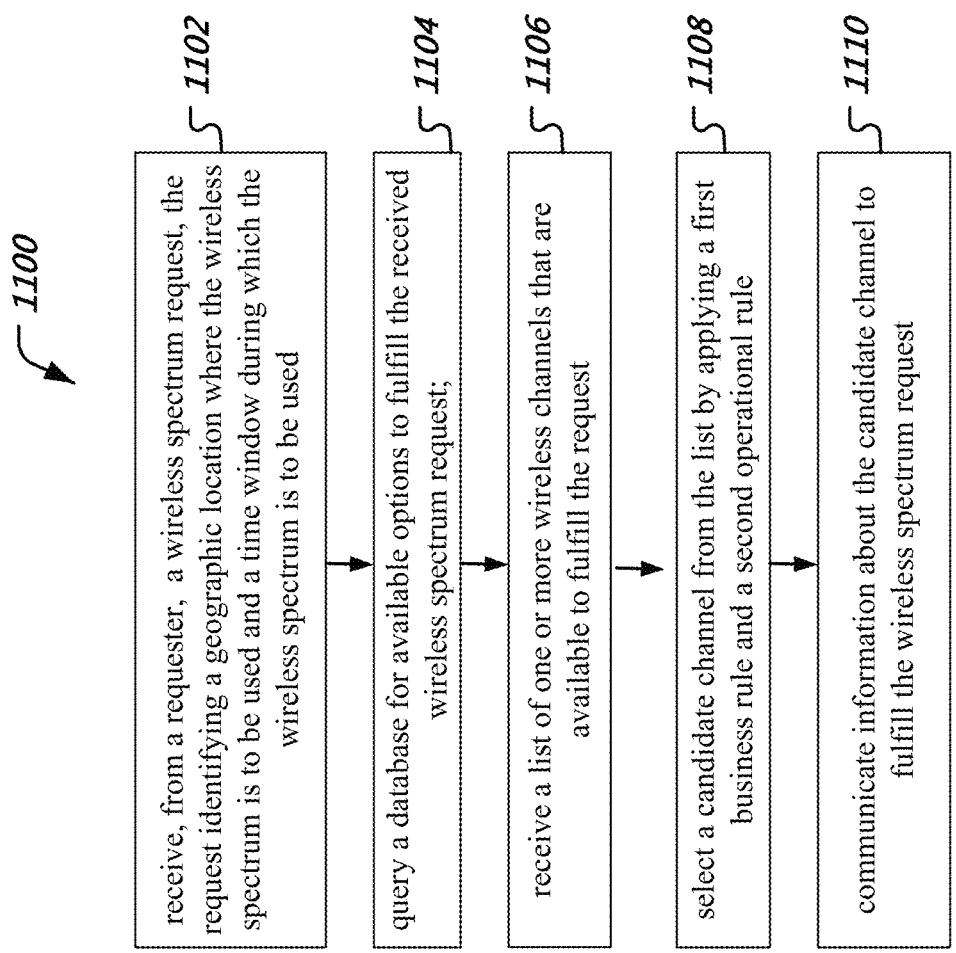
FIG. 11 is a flowchart description on a process of facilitating shared spectrum wireless access.

FIG. 11 is a flowchart depiction of an example procedure 1100 for facilitating wireless communications. The process may be implemented at, e.g., the previously disclosed integrated wireless access gateway (iWAG).

At 1102, a wireless spectrum request is received from a requester. As previously described, the request may be originated by a wireless service provider or another network-side device. The request identifies a geographic location where the wireless spectrum is to be used and a time window during which the wireless spectrum is to be used. The identification may be implicit or explicit. For example, the identification is implicit based on Internet Protocol address (IP) address of the requester and the corresponding geographic area where the IP addresses is located. The time window may also be explicitly or implicitly identified. For example, without any explicit time window description, it would implicitly mean that the request is for infinite time duration (i.e., until a next request is made).

At 1104, a database is queried for available options to fulfill the received wireless spectrum request. The database may be the previously described spectrum database 204. The query may be performed via or from the iWAG 202, as previously described. The database may also be located internal to an apparatus, and therefore the query may or may not travel over an external network connection.

At 1106, a list of one or more wireless channels that are available to fulfill the request is received from the database. As previously discussed, the spectrum database 204 is operated to keep an up-to-date information about which channels are available and which channels are currently being used and what the load level on these channels is. The term "channel" here refers to a contiguous or piecewise contiguous portion of the spectrum. In implementations where channel bonding, i.e., concurrent use of multiple channels is possible, the list may indicate so.

At 1108, a candidate channel is selected from the list by applying a first business rule and a second operational rule. The business rule may check, e.g., whether the available spectrum is licensed to the requester and therefore should be allocated to the requester by indicating to the current users that they need to stop using the channel. Operational rules may include, the previously discussed load balancing considerations. The operational rules may also include emergency messaging consideration, any identified potential bottlenecks in the available network-side communication bandwidth (e.g., on backhaul connections), and so on.

At 1110, the information about the candidate channel is communicated to the requester to fulfill the wireless spectrum request.

Figure 12:
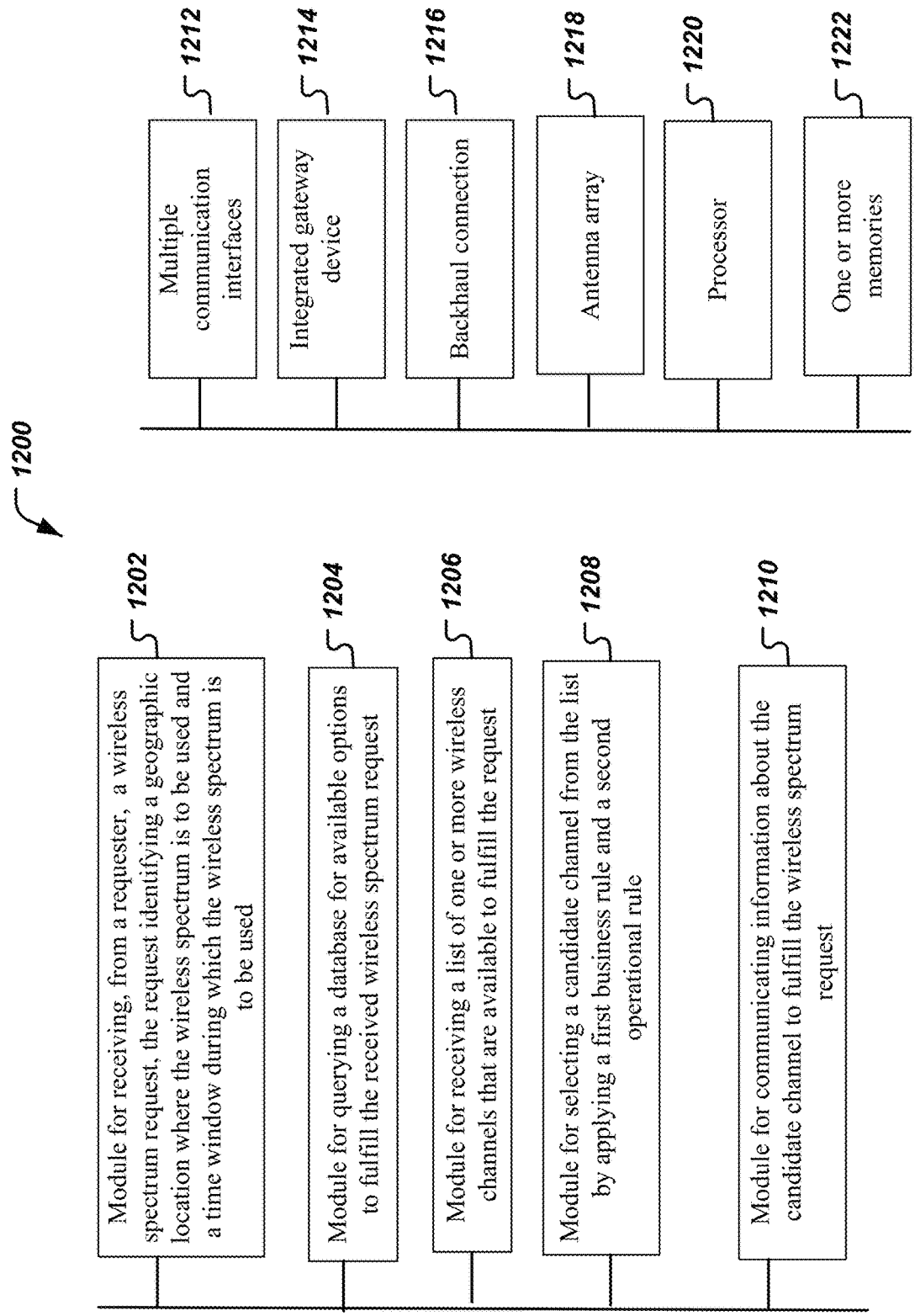
FIG. 12 is a block diagram representation of an apparatus for facilitating shared spectrum wireless access.

FIG. 12 is a block diagram representation of an apparatus 1200 for facilitating shared use of wireless spectrum by multiple service providers. The module 1202 is for receiving, from a requester, a wireless spectrum request, the request identifying a geographic location where the wireless spectrum is to be used and a time window during which the wireless spectrum is to be used. The module 1204 is for querying a database for available options to fulfill the received wireless spectrum request. The module 1206 is for receiving a list of one or more wireless channels that are available to fulfill the request. The module 1208 is for selecting a candidate channel from the list by applying a first business rule and a second operational rule. The module 1210 is for communicating information about the candidate channel to fulfill the wireless spectrum request. In some embodiments, the apparatus 1200 can include multiple communication interfaces 1212 integrated into the apparatus for transmitting and receiving data, wherein each interface is operable on an independent protocol stack and a radio frequency channel, an integrated gateway device 1214 connected to multiple core wireless networks, virtualizing the multiple communication interfaces and exposing the virtualized the multiple communication interfaces to the multiple core wireless networks, a backhaul connection 1216 shared by the communication interfaces to connect to the integrated gateway device, an antenna array 1218 providing data transmission for the multiple communication interfaces, a processor 1220, and one or more memories 1222 configured to store instructions, when executed by the processor, causing the processor to receive a control message from the integrated gateway device over the backhaul connection and manage the multiple communication interfaces to provide wireless services as specified in the control message.

In some implementations, an apparatus for providing wireless services to a plurality of wireless devices includes a plurality of access point instances, each operable on a different radio frequency channel, for providing wireless services on the corresponding radio frequency channels, a backhaul connection over which a control message is received from a gateway device, and an access point controller that controls the plurality access point instances to provide wireless services as specified in the control message.

In some implementations, a wireless communication system includes a database that holds spectral usage and availability information, an access point that operates to provide wireless services from a plurality of service operators and a gateway that receives a wireless spectrum allocation request from a service operator, determines spectrum availability by consulting the database, responds to the service operator with a grant or a denial based on the determined spectrum availability, and controls the access point to provide wireless service according to the response to the service operator.

One of skill in the relevant art will appreciate that the present document discloses techniques that allow multiple wireless service providers to share spectrum available for wireless transmission of user data between wireless devices and wireless networks.

One of skill in the relevant art will further appreciate that, in some implementations, a database server can be communicatively coupled to an integrated wireless network. The database server stores spectrum utilization and availability information that can be used by other network devices to establish user data sessions for wireless devices. The database server may also track spectrum availability and utilization based on location and time information.

One of skill in the relevant art will also appreciate that an integrated wireless access gateway function is disclosed, which can be implemented in a single platform or be distributed across multiple hardware platforms. The integrated wireless gateway may allocate and control various spectral channels to service providers and wireless devices based on business rules (e.g., who has a license and therefore priority to a spectrum), or operational rules (e.g., load balancing).

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is what is described and illustrated, including:

1. A method for facilitating wireless communications, comprising:
   receiving, from a requester, a wireless spectrum request, the request identifying a geographic location where the wireless spectrum is to be used and a time window during which the wireless spectrum is to be used;
   querying a database for available options to fulfill the received wireless spectrum request;
   receiving a list of one or more wireless channels that are available to fulfill the request;
   selecting a candidate channel from the list by applying a first business rule and a second operational rule; and
   communicating information about the candidate channel to fulfill the wireless spectrum request.

2. The method of claim 1, further comprising:
   transmitting a control message to terminate a use of the candidate channel by a wireless entity.

3. The method of claim 1, further comprising:
   monitoring wireless spectrum usage in a wireless service area.

4. The method of claim 3, further comprising:
   receiving, from an access point in the wireless service area, a loading message indicative of a utilization level of the wireless spectrum.

5. The method of claim 1, wherein the first business rule utilizes spectral license ownership of the requester.

6. The method of claim 1, wherein the operational rule relates to load balancing utilization of spectrum at the requested geographic location and during the requested time window.

7. An apparatus, comprising:
   a memory that stores processor executable instructions; and
   a processor that executes the instructions to implement a method comprising:
   receiving, from a requester, a wireless spectrum request, the request identifying a geographic location where the wireless spectrum is to be used and a time window during which the wireless spectrum is to be used;
   querying a database for available options to fulfill the received wireless spectrum request;
   receiving a list of one or more wireless channels that are available to fulfill the request;
   selecting a candidate channel from the list by applying a first business rule and a second operational rule; and
   communicating information about the candidate channel to fulfill the wireless spectrum request.

8. The apparatus of claim 7, further comprising:
   transmitting a control message to terminate a use of the candidate channel by a wireless entity.

9. The apparatus of claim 7, further comprising:
   monitoring wireless spectrum usage in a wireless service area.

10. The apparatus of claim 9, further comprising:
    receiving, from an access point in the wireless service area, a loading message indicative of a utilization level of the wireless spectrum.

11. The apparatus of claim 7, wherein the first business rule utilizes spectral license ownership of the requester.

12. The apparatus of claim 7, wherein the operational rule relates to load balancing utilization of spectrum at the requested geographic location and during the requested time window.

13. A wireless communication system, comprising:
    a database that holds spectral usage and availability information;
    an integrated access point that operates to provide wireless services from a plurality of service operators; and
    a gateway that:
    receives a wireless spectrum allocation request from a service operator,
    determines spectrum availability by consulting the database,
    responds to the service operator with a grant or a denial based on the determined spectrum availability, and
    controls the access point to provide wireless service according to the response to the service operator.

14. The wireless communication system of claim 13, wherein the integrated access point provides wireless services from the plurality of service operators based on a level of utilization of wireless spectrum.

15. The wireless communication system of claim 13, wherein the integrated access point provides wireless services from the plurality of service operators on different radio frequency channels.

* * * * *